Figure 1:
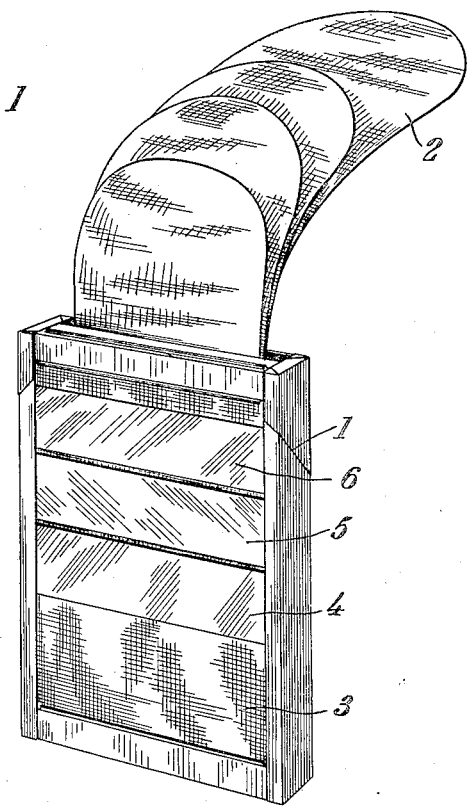

March 19, 1935.  A. VON BIEHLER  1,994,627

FILMPACK FOR MULTICOLOR PHOTOGRAPHY

Filed Dec. 5, 1931

Inventor:
Arpad von Biehler,
By Attorney
Philip S. Hopkins.

Patented Mar. 19, 1935

1,994,627

UNITED STATES PATENT OFFICE 1,994,627

FILMPACK FOR MULTICOLOR PHOTOGRAPHY

Arpad von Biehler, Dessau, Germany, assignor to Agfa Ansco Corporation, Binghamton, N. Y., a corporation of New York Application December 5, 1931, Serial No. 579,269 In Germany December 10, 1930

17 Claims. (Cl. 95—2)

My present invention relates to a filmpack for multi-color photography.

One of its objects is to provide an improved filmpack for multi-color photography. Further objects will be seen from the detailed specification following hereafter.

It is known to prepare multi-color pictures by taking in succession several partial color sensation records of the object to be photographed on layers having a different spectral sensitiveness. This known process, however, is complicated, since for taking each partial picture the objective has to be provided with another filter and the time of exposure of the apparatus has to be changed owing to the different thresholds of perception of the emulsion layers.

My improved filmpack allows of simplifying this troublesome handling. The filmpack contains as usual films being disposed one behind the other and having emulsion layers sensitized for different spectral regions, but before the films there are disposed correction filters. These filters serve on the one hand for absorbing the light rays which shall not act upon the film to be taken, on the other hand for adapting the sensitiveness of the films intended to receive the different partial color pictures to each other, in order to allow all partial color pictures to be made with the same time of exposure. In the case of producing a certain color sensation, for instance, a red or a green sensation, a yellow colored filter is used which subdues the light rays of the blue part of the spectrum (to which the emulsion is normally sensitive). This yellow correction filter can be adjusted by addition of a neutral grey dye if the sensitiveness of the layers sensitized for red and green does not harmonize for a distinct impression. The sensitiveness of the third film which is sensitive for blue can be adjusted to the sensitiveness of the other two films by inserting a yellow or a grey filter of suitable density or by inserting before the objective a yellow filter of suitable density. In the latter case the filter acts as a common compensation filter for all films but has a material influence only on the film sensitive for blue since the other two films are already provided with a yellow filter of higher density which practically absorbs all blue light rays. In this manner by inserting correction filters, the spectral sensitiveness and the minimum exposure value required to obtain the impression on the layers are adapted to one another so that all the emulsion layers have during the photographic operation the same minimum exposure value.

With the filmpack according to my invention the pictures are taken in such a manner that the object is taken $n$ times in succession with the same time of exposure, $n$ being in general 3. Between the different exposures it is only necessary to draw the tab, there being no necessity for the provision of another selection filter and regulation of the shutter speed of the apparatus. At most this process requires a compensation filter which, however, remains the same for the exposures of all partial sensation records.

This compensation filter is inserted in the way of the light rays before reaching the film if the illumination for taking the picture is different from that used for adapting the differently sensitized films to each other. It is obvious that the partial color sensation records made in quick succession by drawing the tabs and by actuating the shutter adjusted to the same time of exposure wanted must be taken with the same illumination. The adaptation of the differently sensitized films to the same minimum exposure value must be effected with a distinct illumination, for instance, with daylight of middle value. The sensitiveness of the films does no longer harmonize, if the illumination is changed, for instance, when illuminating with the red light of the setting sun or with artificial illumination (nitra-light). The harmony of the sensitiveness can, however, easily be regained when inserting before the objective a compensation filter which is the same for taking all partial color sensation records. In the present case, if illuminating with nitra-light a blue-green filter is necessary. If the adaptation of the differently sensitized films was effected with nitra-light, for taking pictures with daylight an orange filter is to be inserted before the objective.

According to one mode of execution of my invention the correction filter is cast on the emulsion layer. This may be performed, for instance, by covering the emulsion layer with a gelatin layer and providing on the latter a coating of fluorescein ammonia from a solution of this dye in alcohol. Still another way is to cover the emulsion layer with a gelatin layer, the gelatin solution from which the layer is made being, for instance, dyed with Benzo Light Yellow R L (cf. Fierz-David "Künstliche organische Farbstoffe" 1926, S. 168). The fluorescein ammonia layer is removed in the developing and fixing bath, the gelatin layer containing Benzo Light Yellow R L is decolorized by an acidified solution of sodium hydrosulfite.

Another mode of execution of my invention consists in providing the correction filter by inserting them in form of a separate foil before the emulsion layer of the film and to connect them in the same manner as the film with the draw tab. After having taken the partial picture the filter can be drawn from the exposure window into the chamber of the filmpack together with the film lying behind it.

Finally, it is possible to form the gelatin layer usually applied to the back of a film in a filter, by giving it suitable coloration. As dyes imparting to this gelatin layer the desired coloration, for instance, I mention tartrazine, filter yellow and quinolin yellow. In this case the exposure is effected through the layer support.

For softening the yellow correction filters neutral grey G (cf. Schultz, Farbstofftabellen 1931 (A) 551) is used, or if the filter is cast on the emulsion layer an addition of, for instance, lampblack, graphite or finely divided silver may be made to the filter layer.

The following example serves to illustrate my invention.

A highly sensitive negative emulsion for cinematographic film is divided into three parts. One part is not sensitized and cast on a celluloid support which is provided on its rear side with a gelatin layer of 15 $\mu$ thickness. This back layer contains on 100 grams of gelatin 1 gram of tartrazin. The second part of the emulsion is sensitized for green with aid of pinaflavol or erythrosin and cast on a celluloid support carrying on its rear side a gelatin layer of 15 $\mu$ thickness. This back layer contains on 100 grams of gelatin about 8 grams of tartrazin. The third part of the emulsion is sensitized for red with the aid of pinacyanol blue and is cast on a celluloid support having on its rear side a gelatin layer of 15 $\mu$ thickness. This back layer contains on 100 grams of gelatin, about 8 grams of tartrazin. For ascertaining the sensitiveness of the different films a grey scale is taken by exposing each film the same period of time through the yellow rear side while illuminating with the same source of light and using different correction filters. In this manner the correction filters are determined which yields identic negatives in the three partial layers for the same time of exposure.

If, for instance, the negatives on the layer sensitized for green and that sensitized for red are identic, and the negative on the layer which is not sensitized is still superexposed the correction filter must only be chosen in a somewhat darker shade for obtaining conformity. If the blackenings of the negative in the layer sensitized for green are to light, for instance, a correction filter having a light green color is used.

Instead of starting from one single emulsion there can be employed emulsions each having different sensitiveness. In this case, however, the curve of gradation of the different emulsions must be identic. This can be effected by incorporating, for instance, a yellow dye in the emulsion layer sensitive to the blue light rays, a red dye to the emulsion layer sensitive to the green light rays and a green dye to the emulsion layer sensitive to the red light rays.

My invention is illustrated in the accompanying drawing, the same reference characters denoting the same parts.

Fig. 1 represents a perspective view of my new filmpack, the covering paper as well as the first three tabs having been drawn to a certain extent. 1 designates the casing of the filmpack. The tabs are marked with 2. The covering paper 3 is nearly wholly removed so that the partially drawn first three films 4, 5 and 6 can be seen. These three films are sensitized for the red, green and blue spectral region and intended for taking the three partial color sensation records of a three color picture. The three films are provided with different filters thru which the picture is taken.

Figure 2:
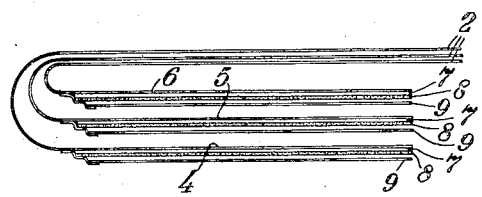
Figure 3:
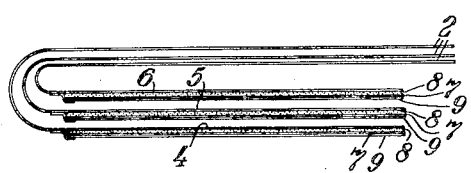

Two modifications of such an arrangement are shown in Figs. 2 and 3. In these figures the three films provided with the tab 2 and belonging to the same group are marked 4, 5 and 6.

In Fig. 2 the film support 7 bears an emulsion layer 8 and is connected to the tab 2. The correction filter 9 forms in this modification a separate foil which for the sake of clearness is shown somewhat removed from the film, but which lies adjacent to the emulsion layer in the filmpack. The filter foil is likewise connected to the tab 2. In this manner the film and filter are drawn together.

In Fig. 3 the emulsion layer 8 is provided on the film support 7 and lies adjacent to the tab 2. The correction filter is formed by a dyed thin gelatin layer cast on the back side of the film support. The film and the filter form in this case one part being connected to the tab. The exposure of the film is made through the support.

I do not wish to limit my invention to the foregoing examples nor to the specific details given therein. Numerous other filter dyes than those mentioned and which are well known to every chemist skilled in the art may be employed, and a few simple comparative experiments should be made in order to determine the most suitable dye for the correction filter and the most suitable amount of the dye to be employed in each particular case. The same holds true with regard to the compensation filter. Furthermore I do not wish to limit my invention to the special use of filmpacks, other packings such as roll films or even cinematographic films having arranged in succession partial films sensitized for different spectral regions, which allow of taking multi-color pictures are likewise intended to be included within the scope of my present invention.

What I claim is:

1. A package for multi-color photography comprising arranged in succession as many photographic films as correspond with the number of partial color pictures to be taken, and an opaque means between two successive films, each film being sensitized for a different spectral region and each film being provided with a yellow filter of such a strength that the films can be taken successively with the same time of exposure when illuminated with a certain source of light.

2. A package for multi-color photography comprising arranged in succession as many photographic films as correspond with the number of partial colors to be taken, and an opaque means between two successive films, each film being sensitized for a different spectral region and each film being provided with a yellow filter containing in addition a grey dyestuff, said filters having such a strength that the films can be taken successively with the same time of exposure when illuminated with a certain source of light.

3. A package for multi-color photography comprising arranged in succession at least one series of three films sensitized for different spectral regions and provided with a yellow filter of such a strength that the films can be taken successively with the same time of exposure when illuminated with a certain source of light.

4. A package for multi-color photography comprising arranged in succession at least one series of the three films sensitized for different spectral regions and an opaque means between two successive films, each of said films being provided with a yellow filter containing a grey dyestuff, said filters having such a strength that the films can be taken successively with the same time of exposure when illuminated with a certain source of light.

5. A package for multi-color photography comprising arranged in succession as many photographic films as correspond with the number of partial color pictures to be taken, and an opaque means between two successive films, each film being sensitized for a different spectral region and each film being provided with a yellow filter containing in addition a dye for subduing the action of the light to which the particular film is sensitive, said filter having such a strength that the films can be taken successively with the same time of exposure when illuminated with a certain source of light.

6. A multi-color film pack comprising arranged in succession at least one series of three films sensitized for different spectral regions and an opaque means between two successive films, each of said films being provided with a yellow filter containing in addition a dye for subduing the action of the light to which the particular film is sensitive, said filter having such a strength that the films can be taken successively with the same time of exposure when illuminated with a certain source of light.

7. In multi-color photography in combination a package comprising arranged in succession as many photographic films as correspond with the number of partial color pictures to be taken, and an opaque means between two successive films, each film being sensitized for a different spectral region and each film being provided with a yellow filter of such a strength that the films can be taken successively with the same time of exposure when illuminated with a certain source of light, and a compensation filter adapting the films of said package to another source of light, so that they can be taken with the same time of exposure.

8. In multi-color photography in combination a package comprising arranged in succession as many photographic films as correspond with the number of partial colors to be taken, and an opaque means between two successive films, each film being sensitized for a different spectral region and each film being provided with a yellow filter containing in addition a grey dyestuff, said filters having such a strength that the films can be taken successively with the same time of exposure when illuminated with a certain source of light, and a compensation filter adapting the films of said package to another source of light, so that they can be taken with the same time of exposure.

9. In multi-color photography in combination a package comprising arranged in succession at least one series of three films sensitized for different spectral regions and provided with a yellow filter of such a strength that the films can be taken successively with the same time of exposure when illuminated with a certain source of light, and a compensation filter adapting the films of said package to another source of light, so that they can be taken with the same time of exposure.

10. In multi-color photography in combination a package comprising arranged in succession at least one series of three films sensitized for different spectral regions and an opaque means between two successive films each of said films being provided with a yellow filter containing a grey dyestuff, said filters having such a strength that the films can be taken successively with the same time of exposure when illuminated with a certain source of light, and a compensation filter adapting the films of said package to another source of light, so that they can be taken with the same time of exposure.

11. In multi-color photography in combination a package comprising arranged in succession as many photographic films as correspond with the number of partial color pictures to be taken, and an opaque means between two successive films, each film being sensitized for a different spectral region and each film being provided with a yellow filter containing in addition a dye for subduing the action of the light to which the particular film is sensitive, said filter having such a strength that the films can be taken successively with the same time of exposure when illuminated with a certain source of light, and a compensation filter adapting the films of said package to another source of light, so that they can be taken with the same time of exposure.

12. In multi-color photography in combination a package comprising arranged in succession at least one series of three films sensitized for different spectral regions and an opaque means between two successive films, each of said films being provided with a yellow filter containing in addition a dye for subduing the action of the light to which the particular film is sensitive, said filter having such a strength that the films can be taken successively with the same time of exposure when illuminated with a certain source of light, and a compensation filter adapting the films of said package to another source of light, so that they can be taken with the same time of exposure.

13. A package for multi-color photography comprising arranged in succession at least one series of three films sensitized for different spectral regions and an opaque means between two successive films, each of said films being provided with a filter layer of gelatin coated with fluorescein ammonia of such a strength that the films can be taken and an opaque means between two successive films, with the same time of exposure when illuminated with a certain source of light.

14. A package for multi-color photography comprising arranged in succession at least one series of three films sensitized for different spectral regions and an opaque means between two successive films, each of said films being provided with a filter dyed Benzolight Yellow RL containing Neutral Grey G, said filters having such a strength that the films can be taken, and an opaque means between two successive films, with the same time of exposure when illuminated with a certain source of light.

15. A package for multi-color photography comprising arranged in succession three films having coated on a support an emulsion layer of the same emulsion, an opaque means between two successive films, the first film being not specially sensitized and carrying on its rear side a gelatin layer of 15 $\mu$ thickness containing 1 gram of tartrazine on 100 grams of gelatin, the second film being sensitized for green with pinaflavol and carrying on its rear side a gelatin layer of 15 $\mu$ thickness containing 8 grams of tartrazine on 100 grams of gelatin, the third film being sensitized for red with pinacyanol and carrying on its rear side a gelatin layer of 15 μ thickness containing 8 grams of tartrazine on 100 grams of gelatin.

16. In multi-color photography in combination a package comprising arranged in succession at least one series of three films sensitized for different spectral regions and provided with a filter layer of gelatin coated with fluorescein ammonia of such a strength that the films can be taken successively with the same time of exposure when illuminated with a certain source of light, and a compensation filter adapting the films of said package to another source of light, so that they can be taken with the same time of exposure.

17. In multi-color photography in combination a package comprising arranged in succession at least one series of three films sensitized for different spectral regions and an opaque means between two successive films each of said films being provided with a filter dyed Benzolight Yellow RL containing Neutral Grey G, said filters having such a strength that the films can be taken successively with the same time of exposure when illuminated, and a certain source of light with a compensation filter adapting the films of said package to another source of light, so that they can be taken with the same time of exposure.

ARPAD von BIEHLER.